United States Patent

Jones

Patent Number: 5,266,404
Date of Patent: Nov. 30, 1993

[54] NON-OXIDE CERAMIC PARTICLES COATED WITH ZIRCONIUM OXIDE OR HYDROUS OXIDE

[75] Inventor: Anthony G. Jones, Sedgefield, England

[73] Assignee: Tioxide Group Services Limited, London, England

[21] Appl. No.: 726,226

[22] Filed: Jul. 5, 1991

[30] Foreign Application Priority Data

Jul. 19, 1990 [GB] United Kingdom ............... 9015892

[51] Int. Cl.$^5$ ............................................. C04B 35/58
[52] U.S. Cl. .................................... 428/403; 428/404; 501/96; 501/97; 501/102; 501/103
[58] Field of Search ............... 428/403, 404; 106/816, 106/286.4; 427/215; 501/87, 88, 96, 97, 102, 103

[56] References Cited

U.S. PATENT DOCUMENTS

| 4,748,138 | 5/1988 | Watanabe et al. ............ 501/87 |
| 4,851,293 | 7/1989 | Egerton et al. ............ 501/103 X |
| 4,951,427 | 8/1990 | St. Pierre ............ 51/293 |

FOREIGN PATENT DOCUMENTS

| 1274522 | 9/1990 | Canada. |
| 1274552 | 9/1990 | Canada. |
| 0157487 | 10/1985 | European Pat. Off. . |
| 211579 | 2/1987 | European Pat. Off. . |
| 0266641 | 5/1988 | European Pat. Off. . |
| 54-088909 | 7/1979 | Japan. |
| 63-252965 | 10/1988 | Japan. |
| 64-51377 | 2/1989 | Japan. |
| 1-51378 | 2/1989 | Japan. |
| 1-126273 | 5/1989 | Japan. |
| 1-133981 | 5/1989 | Japan. |
| WO00578 | 1/1988 | PCT Int'l Appl. . |
| WO90/06906 | 6/1990 | PCT Int'l Appl. . |
| WO906906 | 6/1990 | PCT Int'l Appl. . |
| 2181723 | 4/1987 | United Kingdom. |

*Primary Examiner*—Mark L. Bell
*Assistant Examiner*—C. M. Bonner
*Attorney, Agent, or Firm*—Baker & Botts

[57] ABSTRACT

A composition suitable for the production of ceramics is provided. The composition comprises a particulate material which is a nitride, carbide, carbonitride or boride of Ti, Zr, Al, Si or B having a coating on the particle comprising 5 to 75 wt % with respect to particulate material of an oxide or hydrous oxide of zirconium.

The composition can be used to produce a tough zirconia/non-oxide ceramic without the need to co-mill the ingredients.

A stabilising agent for the zirconia may also be present in the coating although the invention is designed to avoid the necessity for such agents.

Coating usually is effected by a wet treatment process in which the particles are dispersed in a solution of a hydrolysable zirconium salt and the oxide or hydrous oxide is coated on the particles by adjusting the pH of the dispersion.

4 Claims, No Drawings

NON-OXIDE CERAMIC PARTICLES COATED WITH ZIRCONIUM OXIDE OR HYDROUS OXIDE

This invention relates to compositions and particularly to compositions suitable for the production of ceramics.

The addition of zirconia to non-oxide ceramic-forming materials has produced an improvement in the toughness of the fired ceramic and usually this addition has been achieved by co-milling the ceramic-forming material and the zirconia.

A new ceramic-forming composition has been developed which avoids the necessity of co-milling and produces a ceramic having an improved homogeneity and improved physical properties.

According to the present invention a composition suitable for the production of a ceramic comprises a particulate material which is a nitride, carbide or carbonitride of Ti, Zr, Al, Si or B or a boride of Ti, Zr, Al or Si, and said particulate material having a coating on the particles thereof of an oxide or hydrous oxide of Zr in an amount of from 5% to 75% by weight expressed as $ZrO_2$ on the weight of the particulate material.

The present invention provides a composition for use in the production of a ceramic by firing or sintering. The particulate material or powder comprises a nitride, carbide, carbonitride or a boride of certain elements. The elements are titanium, zirconium, aluminium, silicon or boron and in the case of boron then the particulate material is a nitride, carbide or carbonitride.

Generally the particulate material forming the basis of the products of the invention has a size such that the majority of the particles have a diameter less than or equal to 0.5 micron and preferably less than 0.2 micron. Particulate materials having a size much less than 0.2 micron can be used and such particulate materials are the nitrides of Ti, Zr, Al, Si or B having an average diameter size of from 0.01 to 0.1 micron e.g. about 0.05 micron.

The particulate materials can be prepared by any of the known production methods. Typical for the production of nitrides of small size such methods involve the high temperature vapour phase nitridation of the metal or of a vapourised metallic compound such as metal chloride. Other processes carried out at lower temperature can be used but they tend to produce products of larger particle sizes.

Preferably, however, the particulate material, when a nitride, is produced by a method in which ammonia and a halide of Ti, Zr, Al, Si or B, is heated to a reaction temperature by means of an electric plasma under the conditions described and claimed specifically for the production of titanium nitride in UK Patent Application GB 2 217 699A published Nov. 1, 1989 and in UK Patent Application GB 9009915.1 filed May 2, 1990 for other metallic compounds. The nitrides produced by the method of these two GB Patent Applications are of small size and ideally suited to form the basis of ceramic materials.

Particulate carbides, carbo-nitrides and borides can be made by any of the established processes for the production of such materials and need no further explanation.

If desired the compositions of the present invention can include two or more different particulate materials such as two or more different nitrides or, indeed any combination of two or more of the said nitrides, carbides, carbonitrides or borides.

The particulate materials used to form the compositions of the invention are provided with a coating of an oxide or hydrous oxide of zirconium in an amount of from 5% to 75% by weight expressed as $ZrO_2$ on the weight of the particulate material. Preferably the amount of the oxide or hydrous oxide of zirconium is from 15% to 60% expressed as $ZrO_2$ of the weight of the particulate material.

If desired the particulate material can also have a coating of an oxide or hydrous oxide of a known stabilising agent for ceramic material, such as an oxide or hydrous oxide of yttrium, calcium, magnesium, strontium or cerium. However the presence of such an additional hydrous oxide is not a requirement of this invention which is preferably designed to avoid the necessity of the use of such stabilising agents to obtain a stable ceramic.

Usually the coating of the particulate material is carried out as a wet treatment process in which, initially, the material is dispersed in water. Preferably this dispersion is effected directly by mixing the material with water without any dispersing agent being present since this avoids any unnecessary contamination of the product with constituents of the dispersing agent.

The dispersion of the material in water is effected normally by stirring and the amount of the material is such that the obtained dispersion usually contains the material in a concentration of up to 400 g/liter. Usually the amount of the material is not less than 50 g/liter and a convenient concentration to employ in practice is about 200 g/liter. It is, however, possible to improve the degree of dispersion by milling in, for example, a sand mill if desired.

To the aqueous dispersion of the particulate material there is added a water soluble hydrolysable salt of zirconium in an amount sufficient to introduce on hydrolysis the required amount of hydrous zirconia as coating reagent. Typical water soluble salts which can be used are the acid salts such as zirconium chloride, zirconyl chloride and zirconium sulphate or alkaline compounds such as ammonium zirconium carbonate.

If desired a water soluble compound of a known stabilising agent can be added to the dispersion but, as described hereinbefore, this is not a requirement of the invention. A water soluble hydrolysable compound of yttrium, calcium, magnesium, strontium or cerium or a mixture thereof can be added to deposit a hydrous oxide on the particulate material. Typical hydrolysable compounds of yttrium which may be used are the acid salts yttrium chloride, yttrium nitrate and yttrium sulphate. Typical water soluble salts of the other metals which can be employed depend on the particular metal but include the water soluble acid chlorides, nitrates, and some sulphates and acetates.

Precipitation of the hydrous zirconia and other hydrous oxide(s) on the particles is effected by adjusting the pH of the dispersion containing the hydrolysable salt(s) to a value sufficient to deposit the hydrous zirconium oxide and/or other hydrous oxide.

Most appropriately an alkali is added to the dispersion to raise the pH. Preferably the alkali is ammonium hydroxide since the use of ammonia does not introduce any potentially objectionable metallic ions into the solution and waste ammonia can be driven off by heating. For the deposition of zirconium in its hydrous oxide form the addition of ammonium hydroxide is eminently suitable and it also can be used if hydrous yttrium oxide is to be deposited. However where other hydrous metal oxides are to be deposited then a stronger alkali is necessary and usually an alkali metal hydroxide is required such as sodium hydroxide or potassium hydroxide. However when such alkali metal hydroxides are used it is necessary to wash the product adequately to remove any contaminating alkali metal ions. Normally the product obtained should not contain an alkali metal impurity level greater than 0.2% expressed as $M_2O$.

After deposition of the hydrous oxide coating the product is separated by filtering, washing as necessary and drying. If required the dried product may be ground to remove any aggregation that has occurred during processing.

The powdered product is eminently suitable for use in the manufacture of shaped ceramic bodies by firing at temperatures of from 1500° C. to 2000° C., preferably from 1650° C. to 1900° C.

Sintered products find use as cutting tools, engine components and extrusion dies amongst a wide variety of uses.

The compositions of the present invention have improved properties when used as a ceramic. The inclusion of the coating of hydrous oxide of zirconium improves the toughness of the particulate material when fired and the improved homogeneity obtained enables sintering to be successfully accomplished without the necessary presence of other sintering of stablishing agents which are expensive.

The invention is illustrated in the following Examples.

EXAMPLE 1

50 g of silicon nitride (sold by Tosoh Ltd under the grade TS7) with an average crystal size of 0.1 micron were slurried in water and the pH reduced to 0.75 by addition of nitric acid. 250 cm$^3$ of a solution of acid zirconium sulphate (100 g/liter $ZrO_2$) were added were 30 minutes with stirring. After stirring for a further 30 minutes, the pH was raised to 8.5 by the addition of aqueous ammonia solution and then the dispersion was stirred for a further 20 minutes. The dispersion was filtered, washed with water and dried to a powder.

The powder was uniaxially pressed into discs and sintered at 1750° C. for 60 minutes under flowing nitrogen.

The sintered piece had a density 96% of theoretical, a flexural strength of 635 MPa, hardness of 10 GPa and fracture toughness of 10 MPa.m$^{\frac{1}{2}}$.

EXAMPLE 2

Comparative Example 27 g of silicon nitride (sold by Tosoh Ltd under the grade TS7), and 11 g of pure zirconia (Tosoh Ltd, TZ-O) were milled together in iso-propanol for 16 hours. The dispersion was dried to a powder and uniaxially pressed into discs. The samples were sintered at 1750° C. under flowing nitrogen for one hour. The sintered pieces had a density 39% of theoretical, and a strength of 18 MPa. Hardness and fracture toughenss were to low to be easily measured by indentation.

EXAMPLE 3

50 g of titanium nitrided powder having a specific surface area of 25 m$^2$g were slurried in water and the pH was reduced to 0.75 by the addition of nitric acid. 250 cm$^3$ of a solution of acid zironium sulphate (100 g/litre $ZrO_2$) were added over 30 minutes with stirring. After stirring for a further 30 minutes, the pH was raised to 8.5 by the addition of aqueous ammonia solution and the dispersion was stirred for a further 20 minutes. The dispersion was filtered, washed with water and dried to a powder of titanium nitride coated with zironia at a level of 50% by weight $ZrO_2$ with respect to titanium nitride.

The powder was uniaxially pressed and sintered at 1700° C. for 60 minutes under flowing nitrogen.

The stirred piece had a density of 5.1 g cm$^{-3}$ (91% of theoretical), a hardness of 9.5 GPa and a fracture toughness of 11.6 MPa.m$^{\frac{1}{2}}$.

I claim:

1. A composition suitable for the production of a ceramic comprising a particulate material which is a nitride of an element selected from the group consisting of titanium, zirconium, aluminum, silicon and boron and said particulate material having a coating on the particles thereof of an oxide or hydrous oxide of zirconium in an amount from greater than about 25% to about 75% by weight expressed as $ZrO_2$ on the weight of the particulate material wherein the particulate material has an average diameter of from 0.01 to 0.1 micron.

2. A composition according to claim 1 in which the amount of oxide or hydrous oxide of zirconium is from greater than about 25% to about 60% by weight expressed as $ZrO_2$ on the weight of particulate material.

3. A composition suitable for the production of a ceramic consisting essentially of a particulate material which is a nitride of an element selected from the group consisting of titanium, zirconium, aluminum, silicon and boron, wherein said particulate material has a coating on each particle thereof consisting essentially of an oxide or hydrous oxide of zirconium in an amount from greater than about 25% to about 75% by weight expressed as $ZrO_2$ on the weight of the particulate material, and wherein the particulate material has an average diameter of from 0.01 to 0.1 micron.

4. A composition according to claim 3 in which the amount of oxide or hydrous oxide of zirconium is from greater than about 25% to about 60% by weight expressed as $ZrO_2$ on the weight of particulate material.

* * * * *